June 24, 1930.  F. SWOYER  1,766,268
SELF CLEANING VALVE FOR RESERVE TANKS FOR MOTOR VEHICLES
Original Filed July 17, 1928   2 Sheets-Sheet 1
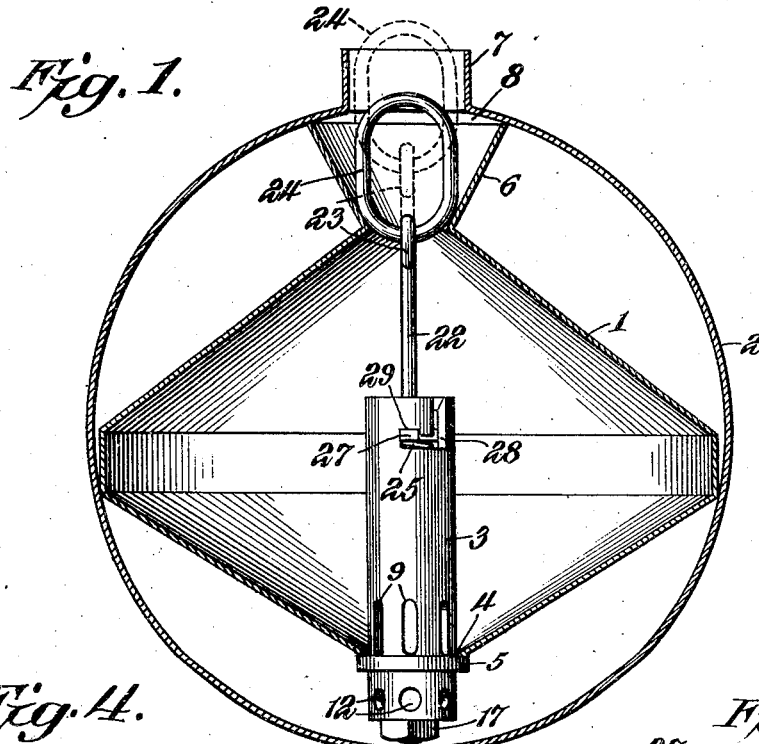
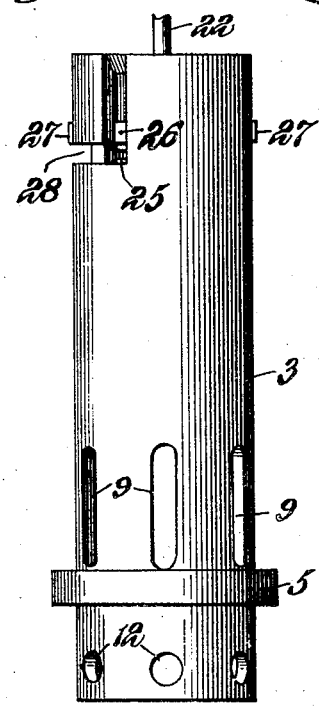
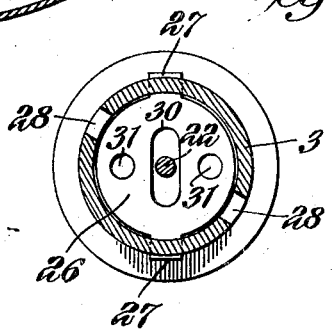
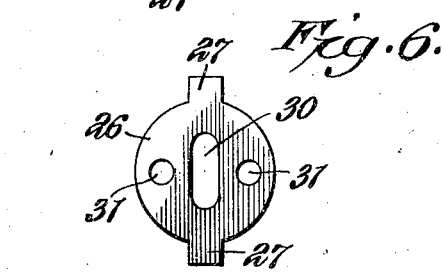
Inventor,
Fred Swoyer,
By
Attorney June 24, 1930.  F. SWOYER  1,766,268
SELF CLEANING VALVE FOR RESERVE TANKS FOR MOTOR VEHICLES
Original Filed July 17, 1928   2 Sheets-Sheet 2
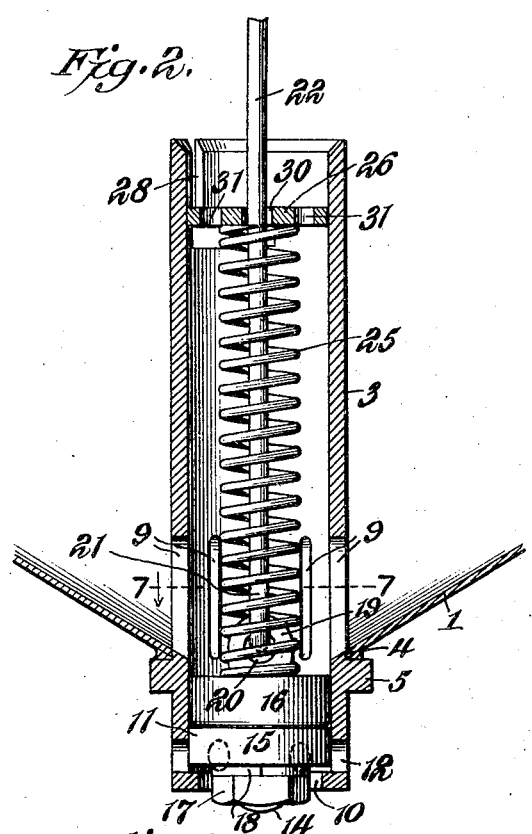
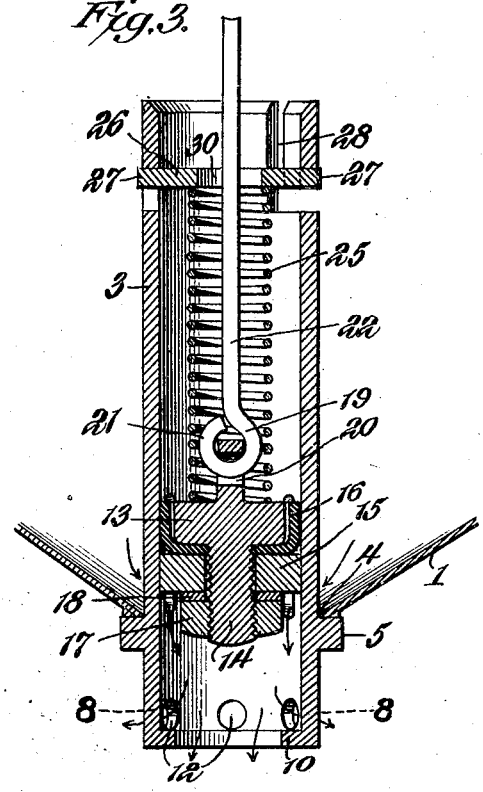
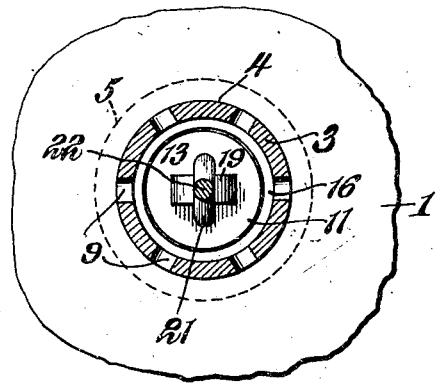
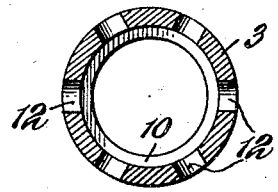
Fred Swoyer, Inventor,
By
Attorney Patented June 24, 1930

1,766,268

UNITED STATES PATENT OFFICE

FRED SWOYER, OF SILVER GROVE, KENTUCKY

SELF-CLEANING VALVE FOR RESERVE TANKS FOR MOTOR VEHICLES

Original application filed July 17, 1928, Serial No. 293,442. Divided and this application filed July 17, 1928. Serial No. 293,443.

The invention relates to self-closing and self-cleaning piston valves for reserve tanks for automobiles and other motor vehicles, and is a division of application Serial No. 293,442, filed by me of even date herewith for the auxiliary or reserve tank illustrated in the accompanying drawings and containing claims for the same.

The object of the present invention is to improve the construction of valves for reserve tanks for automobiles and other motor vehicles and to provide a simple, practical and efficient self-closing and self-cleaning piston valve designed for use in reserve tanks and various other places for controlling the flow of gasoline from one receptacle into another and capable after each operation of wiping the valve seat and preventing accumulation of particles of dirt on the seat, which accumulation causes leakage of gasoline with valves of the ordinary construction.

A further object of the invention is to provide a gasoline valve of this character, which, when opened, will enable the contents of the reserve tank to flow quickly therefrom into the main fuel tank and completely empty the reserve tank, so that the operator will be assured that the entire contents of the reserve tank will be discharged into the main fuel tank.

Another object of the invention is to provide a piston valve which will be practically indestructible and require no grinding and in which the valve assembly may be readily removed as a unit through the filling opening of the main fuel tank should it become necessary to replace a cup leather.

It is also an object of the invention to enable the valve assembly to be easily and quickly replaced in position in a reserve tank after removal.

With these and other objects in view, the invention consists in the construction and novel combination and arrangement of parts hereinafter described, illustrated in the accompanying drawings, and set forth in the claims hereto appended, it being understood that various changes in the form, size, and minor details of construction, within the scope of the claims, may be resorted to without departing from the spirit of the invention or sacrificing any of the advantages thereof.

In the drawings:

Figure 1 is a transverse sectional view of a main and auxiliary tanks provided with a self-closing and self-cleaning valve constructed in accordance with this invention, the valve being shown in elevation.

Fig. 2 is an enlarged vertical sectional view of the valve, the valve piston being in elevation.

Fig. 3 is a similar view taken at right angles to Fig. 2, the valve piston being in section.

Fig. 4 is an enlarged elevation of the valve, the latter being shown in a different position from Fig. 1.

Fig. 5 is a horizontal sectional view through the upper portion of the valve, illustrating the arrangement of the removable stop plate.

Fig. 6 is a plan view of the removable stop plate.

Fig. 7 is a horizontal sectional view through the lower portion of the valve, taken substantially on the line 7—7 of Fig. 2.

Fig. 8 is a similar view taken substantially on the line 8—8 of Fig. 3.

In the accompanying drawings, in which is illustrated the preferred embodiment of the invention, the piston valve, which is designed primarily for controlling the flow of gasoline from an auxiliary or reserve tank 1 into a main fuel tank 2, but which may, of course, be employed in various other similar places, comprises in its construction a valve cylinder 3 designed to be constructed of brass or any other suitable material, which is mounted in an opening 4 in the bottom of the reserve tank 1 and is provided with an exterior annular flange 5 which forms a horizontal shoulder for abutting against the lower edge of the reserve tank. The cylinder 3 is brazed, welded, or otherwise secured to the auxiliary tank, and it extends upwardly into the same and its lower portion depends therefrom. The auxiliary tank is of substantially a double conical formation, as explained in the aforesaid application, and it is welded or otherwise secured within the main tank, and is provided at the top with an opening from which extends an upwardly flaring neck 6 which is welded or otherwise secured to the main tank at opposite sides of the filling opening 7 thereof, so that the gasoline delivered to the main fuel tank will first fill the reserve tank and overflow the same and enter the main fuel tank. The diameter of the downwardly tapered or upwardly flared neck at the top is greater than the diameter of the filling opening of the main fuel tank, and sufficient space is provided at 8 between the upper edges of the neck and the main fuel tank to permit the gasoline to flow freely into the main fuel tank after the reserve tank has been filled.

The valve cylinder 3 is provided above the bottom of the reserve tank with an annular series of vertical inlet slots 9 and its lower end, which is open, is provided with an inwardly extending annular flange 10 which forms a lower stop for a valve piston 11 which when closed occupies a position between the upper slots 9 and the flange 10. The valve cylinder is provided adjacent to the flange 10 with an annular series of outlet openings 12. The interior portion of the cylinder between said sets of openings 9 and 12 forms a valve seat for the piston 11. The combined areas of the open lower end of the cylinder and the openings 12 is equal to or greater than the cross-sectional area of the cylinder, so that the free flow of gasoline from the lower end of the valve cylinder will be permitted. Also, the combined area of the slots 9 is equal to the cross-sectional area of the cylinder, so that free flow of gasoline from the reserve tank into the cylinder is permitted and by this construction a quick and complete emptying of the reserve tank is obtained.

The piston 11 comprises in its construction a cylindrical head 13 provided with a depending threaded stem 14 which receives a valve guide 15 and a cup leather 16. The valve guide 15, which is constructed of brass or other suitable material, has a sliding fit in the valve cylinder, and it steadies and guides the valve and relieves the cup leather of friction and wear. The cup leather 16, which surrounds the head 13, is constructed of suitable leather which is soaked in oil and which expands slightly by slight absorption of gasoline, so that the piston makes a gasoline-tight fit in the cylinder, and the sliding movement of the piston in the cylinder will wipe the valve seat portion of the cylinder and clean the same of any accumulation of dirt, which causes leakage of gasoline in other types of valves.

The valve guide 15 and the flexible cup leather 16 are secured on the stem 14 by a nut 17, a locking washer 18 being preferably interposed between the nut and the lower face of the metallic valve guide.

The head 13 is provided at its upper face with a lug 19 having an opening 20 forming an eye into which is linked an eye 21 of the lower end of an operating rod 22. The operating rod 22 extends above the valve cylinder to the neck 6 and is provided at its upper end with an eye 23 into which is linked a pull ring 24. The pull ring 24 is normally received within the neck 6 and is of greater diameter than the lower end of the same and its upper end is within easy reach from the filling opening of the main fuel tank.

The valve is normally maintained in its closed position by a coiled spring 25 disposed on the operating rod 22 and interposed between the head 13 and a removable stop plate 26 consisting of a disc fitting the interior of the cylinder and provided with opposite lugs 27 which are adapted to be introduced into bayonet slots 28 which are approximately L-shaped. The bayonet slots consist of vertical and horizontal branches, and the horizontal branches are provided at their inner ends with vertical extensions 29 in which the lugs are normally held by the tension of the spring when the valve assembly is in position. The removable stop plate is provided with a central slot 30 for the passage of the operating rod and it is provided at opposite sides of the slot with openings 31 adapted to receive a suitable instrument or instruments to enable the locking plate to be moved downwardly to carry the lugs 27 out of the extensions 29 to permit the locking plate to be partially rotated to bring the lugs opposite the vertical branches of the bayonet slots.

This will permit the valve assembly to be readily withdrawn from the cylinder so that the cup leather can be readily replaced, should the replacing of the same become necessary, but as the guiding of the piston in the cylinder is effected by the valve guide 15, the cup leather will be relieved of much friction and wear and the life of the cup leather will be correspondingly increased.

The pull ring engages the lower end of the neck and limits the downward movement of the valve piston, the operating rod being of a length to permit the piston to move downwardly within the cylinder to within a short distance of the stop flange 10, the piston being normally spaced from the stop flange when the valve is closed. This will prevent noise and rattling. A stop flange forms a stop for the piston in assembling the valve in the auxiliary tank, when the auxiliary or reserve tank is being applied to the main fuel tank.

It will be clear that the downward movement of the valve after an operation thereof will wipe the seat portion of the cylinder so that a clean seating of the valve in the cylinder is assured, and that there will be no liability of any accumulation of dirt on the seat portion of the cylinder which might cause a leakage of the valve.

While the valve is shown and described as applied to the reserve tank of an automobile, yet it will be clear that the valve may be employed in various other places where it is advantageous to use a valve of that type.

What is claimed is:

1. A valve of the class described including a valve cylinder provided at the lower portion with spaced sets of openings and having a seat portion located between the spaced sets of openings, a valve piston slidable in the valve cylinder and having a wiping action to clean the said seat portion and to prevent accumulation of dirt on the seat portion and leakage of gasoline or other liquid.

2. A valve of the class described including a valve cylinder open at the lower end and having an inwardly extending flange thereat and provided at the lower portion above the flange with spaced sets of openings and having a seat portion between the spaced sets of openings, and a valve piston slidable in the cylinder to and from the seat portion and having a wiping action to clean the said seat portion and prevent accumulation of dirt thereon.

3. A valve of the class described including a valve cylinder open at the lower end and having an inwardly extending flange thereat and provided at the lower portion above the flange with spaced sets of openings and having a seat portion between the spaced sets of openings, a valve piston slidable in the cylinder to and from the seat portion and having a wiping action to clean the said seat portion and prevent accumulation of dirt thereon, a spring for holding the valve piston normally on said seat portion, and a removable stop detachably interlocked with the upper portion of the valve cylinder and forming an abutment for the upper end of the coiled spring.

4. A valve of the class described including a valve cylinder open at the lower end and having an inwardly extending flange thereat and provided at the lower portion above the flange with spaced sets of openings and having a seat portion between the spaced sets of openings, a valve piston slidable in the cylinder to and from the seat portion for opening and closing, respectively, the valve and having a wiping action to clean the said seat portion and prevent accumulation of dirt thereon, said valve cylinder being provided at its upper portion with slots consisting of inlet portions and horizontal branch portions provided with terminal extensions, a stop plate provided with lugs detachably interlocked with the said slots and normally arranged in the said extensions thereof, and a coiled spring interposed between the stop plate and the valve piston and normally maintaining the latter in closed position.

5. A valve of the class described including a valve cylinder open at the lower end and having an inwardly extending flange thereat and provided at the lower portion above the flange with spaced sets of openings and having a seat portion between the spaced sets of openings, a valve piston slidable in the cylinder to and from the seat portion for opening and closing, respectively, the valve and having a wiping action to clean the said seat portion and prevent accumulation of dirt thereon, said valve cylinder being provided at its upper portion with slots consisting of inlet portions and horizontal branch portions provided with terminal extensions, a stop plate provided with lugs detachably interlocked with the said slots and normally arranged in the said extensions thereof, a coiled spring interposed between the stop plate and the valve piston and normally maintaining the latter in closed position, and an operating rod connected with the valve piston and having said coiled spring disposed on it and extending through the stop plate, the latter being removable from the said slots to permit the valve piston, spring and plate to be removed from the valve cylinder as a unit.

6. A valve of the class described including a valve cylinder having an inlet and an outlet and provided with a seat portion and a valve piston controlling the inlet and having a wiping action to clean the seat portion and prevent accumulation of dirt thereon, said valve piston comprising a cylindrical head having an upwardly extending lug and provided with a depending threaded stem, a flexible packing cup arranged on the head and engaging the walls of the cylinder, a substantially cylindrical valve guide arranged on the stem below the packing cup and slidable in the cylinder to prevent rocking of the valve to relieve the packing of friction and wear, and a nut arranged on the threaded stem for holding the parts of the piston together, and operating means connected with the lug of the valve piston.

7. A valve of the class described including a valve cylinder having spaced sets of openings and having a seat portion between said sets of openings, a valve piston slidable in the cylinder and having a wiping action to clean said seat portion and to prevent accumulation of dirt on the seat portion and leakage of gasoline or other liquid, a stop plate detachably secured to the upper portion of the cylinder, an operating rod connected with the valve piston and extending through said stop plate, and a coiled spring encircling the rod and at one end bearing against the valve piston and at the other end bearing against the stop plate, said spring normally maintaining the valve piston on said seat portion between the aforesaid sets of openings and the latter being located at opposite sides of the valve piston when the latter is in closed position.

8. A valve of the class described including a valve cylinder having spaced sets of openings and having a seat portion between said sets of openings, a valve piston slidable in the cylinder and having a wiping action to clean said seat portion and to prevent accumulation of dirt on the seat portion and leakage of gasoline or other liquid, and spring controlled means constructed and arranged to maintain the valve piston normally on said seat portion between said spaced sets of openings and the latter being located at opposite sides of the valve piston when the latter is in closed position.

In testimony whereof I have hereunto set my hand this 13th day of July, 1928.

FRED SWOYER.